(12) United States Patent
Poth et al.

(10) Patent No.: US 6,355,722 B2
(45) Date of Patent: Mar. 12, 2002

(54) AQUEOUS BINDER SOLUTIONS AND DISPERSIONS

(75) Inventors: Ulrich Poth, Münster; Lutz-Werner Gross, Haltern, both of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/878,552

(22) Filed: Jun. 11, 2001

Related U.S. Application Data

(62) Division of application No. 08/784,936, filed on Jan. 15, 1997, now Pat. No. 5,241,601.

(30) Foreign Application Priority Data

Jan. 25, 1996 (DE) .......................................... 196 02 555

(51) Int. Cl.$^7$ ........................ C08L 67/02; C08L 67/06; C08J 3/02
(52) U.S. Cl. ..................... 524/601; 524/599; 524/600; 523/401; 523/402; 528/298; 528/300; 528/502
(58) Field of Search .................................. 524/599, 600, 524/601; 523/401, 402; 528/298, 300, 502

(56) References Cited

U.S. PATENT DOCUMENTS

| | | | |
|---|---|---|---|
| 4,011,185 A | 3/1977 | Hosokawa et al. ......... | 524/600 |
| 4,069,183 A | 1/1978 | Daimer ....................... | 260/29.3 |
| 4,914,148 A | 4/1990 | Hille et al. .................. | 524/507 |
| 5,210,154 A | 5/1993 | Weidemeier et al. ....... | 525/438 |
| 5,370,910 A | 12/1994 | Hille et al. ............... | 427/407.1 |
| 5,466,776 A | 11/1995 | Krautstrunk et al. .......... | 526/68 |
| 5,589,228 A | 12/1996 | Wegner et al. .............. | 524/561 |

FOREIGN PATENT DOCUMENTS

| | | |
|---|---|---|
| AU | 83245/87 B | 10/1987 |
| DE | 35 45 618 A1 | 12/1985 |
| DE | 38 13 866 A1 | 4/1988 |
| DE | 38 32 826 A1 | 9/1988 |
| DE | 40 05 961 A1 | 2/1990 |
| EP | 0 038 127 A1 | 3/1981 |
| EP | 0060505 | 9/1982 |
| EP | 0 355 433 A2 | 7/1989 |
| EP | 0 269 828 B1 | 3/1991 |
| JP | 00 62339 | 5/1977 |

OTHER PUBLICATIONS

English Translation of JP 0062 339, Hosokawa, "Process for producing electrically Insulating coatings with water as solvent", May 23, 1977, pp. 1–6.
English Translation of DE 38 32 826 A1.
English Translation of DE 40 05 961 A1.

*Primary Examiner*—Tae H. Yoon

(57) ABSTRACT

Aqueous solutions or dispersions of binders for preparing aqueous coating materials are produced, including as an aqueous component water of reaction which is obtained during the condensation of alcohols with carboxylic acids.

17 Claims, No Drawings

AQUEOUS BINDER SOLUTIONS AND DISPERSIONS

CROSS-REFERENCE TO RELATED APPLICATIONS

The present application is a divisional application of U.S. Ser. No. 08/784,936, filed on Jan. 15, 1997 now U.S. Pat. No. 5,241,601, which claims priority from DE 196 02 555.9, filed on Jan. 25, 1996, both of which are incorporated herein by reference.

The present invention relates to aqueous solutions and dispersions of binders for preparing aqueous coating materials, and to processes for their preparation.

The condensation of alcohols with carboxylic acids produces per crosslinked hydroxyl or carbonyl—group one molecule of water, H2O:

$$R_1\text{—OH} + \text{HOOC—}R_2 \rightarrow R_1\text{—O—CO—}R_2 + H_2O$$

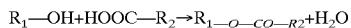

alcohol+carboxylic acid→ester+water

Since the ester is the reaction product which is of interest, in the prior-art preparation processes the water produced is removed from the reaction mixture as so-called "water of reaction". This water of reaction is generally contaminated with other components of the reaction and must therefore be disposed of. A procedure of this kind is necessary, for example, in the coatings industry in connection with the preparation of coating binders.

In the coatings industry, the preparation of polyesters and alkyd resins from polycarboxylic acids and/or polycarboxylic anhydrides and polyalcohols and, if desired, monocarboxylic acids by condensation reactions gives rise to a quantity of about 5 to 11%, based on the polymer produced, of water of reaction. The water of reaction is normally removed effectively from the reaction mixture with the assistance of entrainers (for example xylene).

The vapor mixture comprising water of reaction and entrainer is—especially where saturated polyesters are being prepared—passed through a column whose function is to separate volatile polymer building blocks (especially lower polyalcohols) from the vapor mixture by liquid/vapor exchange and thereby to avoid losses of these building blocks from the reaction mixture. For polyesters and alkyd resins, which contain no constituents which are volatile—under the reaction conditions in the reactor or with steam—an overflow pipe is employed.

In each case, however, the vapor mixture is subsequently liquefied in a condenser and is collected in a separation receiver. In the separation receiver, an aqueous phase of relatively high specific gravity separates from the organic phase of lower specific gravity. The organic phase consists almost entirely of the entrainer employed; it is separated from the aqueous phase by means of an overflow and is passed into the reactor at the head of the column (circulation technique) possibly under control and by means of the use of a pump (possibly a metering pump).

Another possibility is to operate without entrainer. In this case there is no need for a separation receiver but only for a single receiver into which aqueous phase is collected.

Although the aqueous phase contains high proportions of water, it is always contaminated with relatively small amounts of volatile or steam-volatile building blocks (mostly lower polyols) and/or with water-soluble degradation products from the building blocks of the polyester as well. Degradation products which may be produced and may be present in the aqueous phase of the water of reaction are monoalcohols, partial aldehydes of polyols, acetals, and in special cases cyclic, oxygen-containing compounds as well.

Separation of the secondary constituents from the aqueous phase during the preparation of polyesters and alkyd resins, by distillation or extraction, is complex and does not lead to reusable materials. Simple disposal of the distillate, for example by way of settling basins, is a risk. Usually, therefore, despite its small content of organic constituents the water of reaction is incinerated, usually together with other residues which are richer in organic substances. This requires separation and storage of the waters of reaction and special control as they are fed to the incinerator.

Because of their ecological advantages, water-dilutable coating materials have increasingly been used in the coatings industry in recent years. With these coating materials it is possible largely or completely to dispense with organic solvents whose evaporation as the coating material dries leads to emissions and to the known, associated environmental problems. In the course of preparing such aqueous coating systems, the binders of the coating material must be brought into the form of an aqueous solution or dispersion. Dispersions of this kind are highly unstable. Even small quantities of impurities may destroy or severely hinder the dispersibility of the binders. For example, a solution of this kind cannot be prepared using tap water (drinking water, mains water), which contains inorganic constituents. It is therefore necessary to employ deionized or distilled water. This implies more complex preparation and therefore increased preparation costs as well.

The object which the present invention has set itself is to avoid the disadvantages of the prior art, described above, which occur in particular during the disposal of water of reaction and during the preparation of binder dispersions.

This object is achieved in accordance with the invention by an aqueous solution or dispersion of a binder for preparing aqueous coating materials, which solution or dispersion includes as at least one aqueous component the water which can be prepared by condensation of alcohols with carboxylic acids and can be separated off from the condensation mixture.

It has surprisingly been found that during the preparation of polyesters or alkyd resins (which are then preferably employed for water-dilutable coating PAT 95445 systems, the water of reaction is able to replace a portion of the distilled or deionized water which is otherwise used to prepare the aqueous colloidal solution or dispersion of the polyester or alkyd resin. Unlike tap water (drinking water, mains water), which contains certain proportions of inorganic constituents which impair the usefulness for preparing aqueous colloidal solutions or dispersions of coating binders, it is possible with fractions of the waters of reaction to prepare stable aqueous colloidal solutions. The use of these aqueous polyester-resin or alkyd-resin solutions or dispersions in aqueous coating systems has only an insignificant influence on their properties. This effect was completely surprising in view of the sensitivity of the binder dispersions to impurities. On the basis of conventional experience, the opposite was to be expected. However, it is found that in most cases the secondary constituents act as cosolvents. If aqueous coating systems are employed on application lines with stoving furnaces—which is generally the case with the industrial use of aqueous coating systems—the abovementioned substances accompanying the water of reaction do not become volatile until they are in the stoving furnace, although some of them also participate in film forming (for example reaction with amine resins). Environmental pollution as a result of the constituents, therefore, is largely ruled out, and in any case the waste air from stoving furnaces includes organic cleavage products and is therefore cleaned by means of catalytically processes or filters.

In the text below, the term water of reaction is intended always to denote the water which is eliminated during the condensation of alcohols with carboxylic acids and which is or can be separated off from the condensation mixture.

In accordance with the invention, the water of reaction is preferably taken from reactions in which the alcohols are present as polyalcohols, the term polyol referring to an organic compound which bears at least 2 hydroxyl groups. Examples of suitable polyols are ethylene glycol, propanediols, butanediols, pentanediols, neopentylglycol, hexanediols, diethylene glycol, glycerol, trimethylolethane, trimethylol-propane, pentaerythritol, dipentaerythritol, neopentylglycol hydroxypivalate, 2-methyl-2-propyl-1,3-propanediol, 2,2,4-trimethyl-l,3-pentanediol and 2,2,5-trimethyl-1,6-hexanediol It is preferred to employ neopentylglycol, 1,6-hexanediol and neopentylglycol hydroxypivalate. The polyols can of course be employed in pure form or as mixtures.

In the case of the novel preparation of the water of reaction, polycarboxylic acids are preferably employed. These may comprise a polycarboxylic acid containing at least three carboxyl groups, or derivatives of such an acid (e.g. anhydride, ester or halide). It is likewise possible to employ a mixture of such acids and/or acid derivatives. As examples there are, trimellitic acid, trimesic acid (1,3,5-benzenetricarboxylic acid), pyromellitic acid and trimeric fatty acids. Trimellitic acid is preferably employed.

As carboxylic acid it is also possible to employ a polyol which has at least one carboxyl group. Dimethylolprophonic acid is preferably employed. It is likewise possible to employ any polycarboxylic acid which contains two carboxyl groups and is suitable for preparing polyesters, or to employ a reactive derivative (e.g. anhydride, ester or halide) or a mixture of such acids and/or acid derivatives. Examples of suitable acids which may be mentioned are: phthalic acid, isophthalic acid, terephthalic acid, fumaric acid, maleic acid, endomethylenetetrahydrophthalic acid, succinic acid, adipic acid, suberic acid, acelaic acid, sebacic acid and dimeric fatty acids. It is preferred to employ phthalic acid, isophthalic acid, adipic acid and dimeric fatty acids.

As its aqueous component the novel aqueous solution or dispersion of a binder may include a mixture of the water of reaction according to the invention and deionized water. This is sensible, for example, if owing to the production process there is not sufficient water of reaction available to prepare the desired quantity of dispersion. The aqueous component preferably includes from 0.1 to 80% by weight, and with very particular preference from 1 to 20 by weight, of the water of reaction in the sense of the invention.

Suitable binders from which it is intended to prepare an aqueous solution or dispersion are in principle all binders known for this purpose. Particularly suitable binders are: polyester, alkyd, acrylate, epoxy, polyurethane and/or epoxide-modified polyester resins, and also modifications of these binders. The preparation of epoxide-modified polyester resins, for example, takes place in accordance with techniques which are known per se.

The novel water-dilutable coating compositions may in principle contain all binders suitable for water-dilutable coating compositions.

Binders which can be used are, accordingly, both refined natural products, for example from rosins or oils or cellulose nitrates, and resins built up entirely by synthetic means The latter include phenolic resins, amine resins (e.g. urea resins, melamine resins), alkyd resins, polyvinyl acetates, epoxy resins, polyurethane resins, polyester resins, rosin-modified phenolic resins, chlorinated rubbers, chlorinated polypropylene, cyclized rubbers, ketone resins and acrylate resins.

Amino resins, polyester resins, polyacrylate resins and polyurethane resins which can be prepared in organic solution and which are water-dispersible or water-dilutable, and mixtures thereof, are employed in particular as binders.

The polyurethane resins employed as binders are known in principle. Examples of suitable polyurethane resins are those described in the literature for use in waterborne coating materials, provided these polyurethane resins—in a modification of the preparation described in the respective literature can be prepared in the form of organic solutions.

Examples of suitable polyurethane resins are the resins described in the following documents: EP-A-355433, DE-A 3545618, DE-A 3813866 and the as yet unpublished German Patent Application DE 4005961.8. For further details of the preparation of the polyurethane resins and examples of suitable compounds, therefore, reference may be made to these documents.

The polyacrylate resins employed as binders are likewise known and are described, for example, in DE-A 3832826. Suitable polyacrylate resins are General water-dilutable and/or water-dispersible polyacrylate resins which can be prepared in the form of organic solutions.

Also suitable as binders are polyester resins which are water-dilutable or water-dispersible and can be prepared in the form of organic solutions. Use is made, for example, of corresponding commercially available water-dilutable or water-dispersible polyester resins, and of the polyester resins which are customarily employed in waterborne coating materials.

Water-dilutable and water-dispersible amino resins are also suitable as binders. It is preferred to employ water-dilutable melamine resins. Generally, these are etherified melamine-formaldehyde condensation products.

The water-solubility of the amino resins depends—apart from the degree of condensation, which should be as low as possible—on the etherification component, with only the lowest members of the alcohol or ethylene glycol monoether series giving rise to water-soluble condensation products. The methanol-etherified melamine resins are of greatest importance. If solubilizers are used, butanol-etherified melamine resins can also be dispersed in aqueous phase. Another possibility is to incorporate carboxyl groups into the condensation product. Transetherification products of highly etherified formaldehyde condensation products with hydroxycarboxylic acids are water-soluble via their carboxyl groups, after neutralization, and may be present in the base paints.

As binders it is of course also possible to employ mixtures of the binders mentioned and, in addition or alone, other water-dilutable or water-dispersible binders.

The novel coating compositions may include customary additions, such as solvents, fillers, plasticizers, stabilizers, wetting agents, dispersion auxiliaries, leveling agents, antifoams and catalysts, and also additives, individually or in a mixture in the customary quantities. These substances may be added to the individual components and/or to the overall mixture.

Examples of suitable fillers are talc, mica, kaolin, chalk, quartz flour, absestos flour, slate flour, barium sulfate, various silicic acids, silicates, glass fibers, organic fibers or the like.

In addition to water, the novel coating compositions may include the customary solvents, for example aliphatic or aromatic hydrocarbons, mono- or polyhydric alcohols, ethers, esters, glycol ethers and their esters, ketones, such as, for example, toluene, xylene, butanol, ethyl- or butylglycol (=ethylene glycol monoethyl or -butyl ether) and their acetates, butyl diglycol (ethylene glycol dibutyl ether), ethylene glycol dimethyl ether, diethylene glycol dimethyl ether, cyclohexanone, methyl ethyl ketone, acetone, isophorone or mixtures thereof.

It is additionally possible to add crosslinked polymeric microparticles, as are disclosed, for example, in EP-A-38 127, and/or customary inorganic or organic additives to the novel basecoats. Thus examples of effective thickeners are water-soluble cellulose ethers, such as hydroxyethyl cellulose, methylcellulose or carboxymethylcellulose, and also synthetic polymers having ionic and/or associative groups, such as polyvinyl alcohol, poly(meth)acrylic acid, polyvinylpyrrolidone, styrene-maleic anhydride or ethylene-maleic anhydride copolymers and their derivatives, or else hydrophobically modified ethoxylated piperidine and triethanolamine used [sic]. With particular preference, tertiary amines are employed as neutralizing agents, especially dimethylethanolamine, triethylamine, tripropylamine and tributylamine.

The novel basecoat compositions may include all dyes or pigmets which are known and are customary in the coatings industry.

Examples of dyes and pigments, which may be inorganic or organic in nature, are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel-titanium yellow, chromium-titanium yellow, iron oxide red, iron oxide black, ultramarine blue, phthalocyanine complexes, naphthol red, quinacridones, halogenated thioindigo pigments or the like.

As particularly preferred pigments use is made of metal powders, individually or in a mixture, such as copper, copper alloys, aluminium and steel, preferably aluminium powders, in at least the predominant proportion, namely in a quantity of from 0.5 to 25% by weight based on the overall binder solids content of the coating compositions. Preferred metallic pigments are those commercially available metal powders which have been specially pretreated for aqueous systems. The metal powders may also be employed together with one or more of the abovementioned nonmetallic pigments and/or dyes. In this case their proportion is chosen such that the desired metallic effect is not suppressed.

The novel binder solution or binder dispersion is preferably used for producing aqueous coating materials. For this purpose it is processed further, together with crosslinkers (e.g. amino resins, especially those of the type hexamethoxymethylmelamine, urea resin, water-dilutable epoxy resin and the like) optionally further binders, pigments, fillers and other customary additives, to form an aqueous coating material. In addition to water, the latter may also, to a minor extent, comprise organic solvents as diluents.

The scope of the present invention also includes the aqueous coating material obtained by using the described binder solution or binder dispersion. The present invention started out, inter alia, from the object of avoiding the problems associated with the water of reaction which occurs in the case of condensation reactions. In the prior art, this water of reaction is separated off from the reaction mixture and then disposed of expensively. The invention, by contrast, proposes employing the water of reaction as an aqueous component in the preparation of aqueous dispersions or solutions of organic substances. Examples of such substances and/or of such a use is the above-described preparation of aqueous binder dispersions and binder solutions. However, it is obvious that the use of the water of reaction is not restricted to these specific groups of substances. Rather, the water of reaction can be employed as solvent whenever the contaminants which it may still contain are harmless for the dispersion or solution to be prepared. The advantage of such a water of reaction is that its composition and the possible accompanying substances which are present in it are known with great precision, provided one knows the precursors of the underlying condensation reaction. In particular, the water of reaction has none of the inorganic impurities of customary tap water.

The invention also relates to a process for preparing binder solutions or binder dispersions for aqueous coating materials, which is characterized by the following steps:

a) water of reaction eliminated during the condensation of alcohols and carboxylic acids is separated off from the condensation mixture, b) if desired, the water of reaction separated off is mixed with deionized water, and c) the binder is dissolved or dispersed in the aqueous component obtained in accordance with a) and b).

The water of reaction in process step a) may in principle come from a condensation reaction which has nothing to do with the binder concerned. Preferably, however, at least part of the binder is prepared by the condensation reaction of step a). This is because a particularly rational process is one in which the water of reaction of a polyester or alkyd resin which is employed in aqueous coating systems is employed directly by decantation from the separating receiver in the course of preparing the aqueous colloidal solution of the polyester concerned in a dilution vessel which in most cases is connected to the reactor.

In a further, independent process for preparing binder solutions or binder dispersions for aqueous coating materials, the following steps are carried out:

a) binder is prepared by condensation of polyol and poly- or monocarboxylic acids, with the water of reaction eliminated during the condensation remaining in the condensation mixture, b) if desired, deionized water is added, and c) if desired, further binders are added.

This process can be employed whenever at least some of the binder is prepared in a condensation reaction of polyols and carboxylic acids and when the water of reaction which occurs in this condensation reaction, including the impurities which may still be present, does not impair the dispersion which is to be prepared. In this case the process described is particularly advantageous, since it avoids the step of separating off the water of reaction from the condensation mixture. Since the water of reaction in some cases is not present in sufficient quantities for the dispersion to be prepared, it is possible if required to add further deionized water.

The invention is explained below with reference to a working example.

1. Conventional Preparation of a Polyester (cf. EP 0 269 828

442.4 g of 1,6-hexanediol and 166.6 g of a technical-grade polymeric fatty acid (dimer content at least 80% by weight, trimer content not more than 20% by weight, monomer content not more than 1% by weight) are weighed into a stainless steel reaction vessel which can be heated by means of heat transfer oil and is provided with an anchor stirrer, a packed column, a vapor condenser with receiver, an inert-gas supply line ($N_2$) and temperature sensors for the temperature of the reaction material and the vapor temperature at the column head, and are heated to 130° C. Then 184.3 g of isophthatic [sic] acid are added, and heating is continued.

As soon as water of condensation is formed (from about 160° C.), the temperature of the reaction material is raised to not more than 220° C., while distilling off the water of condensation, at such a slow rate that the vapor temperature at the column head does not exceed 103° C. Condensation is continued at 220° C. until the reaction material has reached an acid number of 10.5. After cooling to 140° C., 266.7 g of trimellitic anhydride are introduced with stirring and in portions into the reaction material. Subsequently, the mixture is heated to 150° C. and esterification is carried out until the reaction material has reached an acid number of 67.7. It is then cooled to 120° C. and diluted with ethylene glycol monobutyl ether to give a solution having a solids content of 85% by weight (determined after drying at 130° C. for 60 minutes in a convection oven). A sample diluted with ethylene glycol monobutyl ether to 50% by weight exhibits a solution viscosity of 420 mPas (23° C. ICI plate-cone viscometer). The 85% strength polyester solution is heated to 140° C., and 209.8 g of an epoxy resin of bisphenol A and epichlorohydrin, of an epoxide equivalent weight of 490, are added in portions and with stirring. The mixture is then reacted at 140° C. until an epoxide equivalent weight of more than 50,000 and an acid number of 42.1 (based on solids) have been reached. The mixture is then cooled to 100° C. and is neutralized with 64.6 g of N,N-dimethylethanotamine [sic]. The reaction material is then discharged with stirring into 2000 g of deionized water which has been heated to 60° C., and by intensive stirring a stable binder dispersion is produced which is adjusted with 180 g of deionized water and N,N-dimethylothanolamine [sic] to a solids content of 35% by weight (determined after drying at 130° C. for 60 minutes in a convection oven) and to a pH at 230° C. of 6.67.

2. Modification of the Polyester Preparation, in Accordance with the Invention

The procedure set out under 1. is repeated. In the first two reaction steps, 79.04 g of water of reaction are obtained. In contrast to the method mentioned, the described addition of 180 g of water is reduced by this quantity, and the water of reaction mentioned is separated from the organic phase in a decanter and then added, following the first addition of water, to the colloidal aqueous polyester solution, followed by 100.96 g of deionized water as a make-up quantity.

The polyester solution prepared in this way was tested in comparison with the polyester solution prepared by the customary process. Both solutions are weakly opaque and stable, and after aging at 40° C. for 5 days exhibit a sufficient comparable stability (acid number, pH, viscosity). Both polyesters were used as described in EP 0 269 828 to formulate and apply water-based primer-surfacers and a comparison was carried out. There are no significant differences in application characteristics (leveling, gloss, topcoat holdout) or in the technical properties of the water-based primer-surfacers (hardness, elasticity and stone-chip resistance).

What is claimed is:

1. A method of preparing a solution or dispersion of an aqueous coating composition comprising dissolving or dispersing at least one binder in an aqueous component, wherein the aqueous component comprises a water of reaction, wherein the water of reaction (i) is produced by a condensation reaction of at least one alcohol with at least one carboxylic acid and (ii) has been separated from the condensation reaction.

2. The method of claim 1, wherein at least some of the binder is prepared by the condensation reaction.

3. The method of claim 1 further comprising adding deionized or distilled water to the binder.

4. The method of claim 1 further comprising mixing the water of reaction with deionized or distilled water prior to dissolving or dispersing the binder.

5. The method of claim 1, wherein the water of reaction comprises water and contaminants consisting of those selected from the group consisting of polyols, monoalcohols, partial aldehydes of polyols, acetals, cyclic oxygen-containing compounds, unreacted reactants, water-soluble degradation products, and mixtures thereof.

6. The method of claim 1, wherein the carboxylic acids is selected from the group consisting of trimellitic acids, trimesic acids (1,3,5-benzenetricarboxylic acid), pyromellitic acids, trimeric fatty acids, dimethylolpropionic acid, phthalic acids, isophthalic acids, terephthalic acids, fumaric acids, maleic acids, and mixtures thereof.

7. The method of claim 1, wherein the alcohol is a polyalcohol selected from the group consisting of ethylene glycol, propanediols, butanediols, pentanediols, hexanediols, diethylene glycol, glycerol, trimethylolethane, trimethylolpropane, pentaerythritol, dispentaerythritol, 2-methyl-2-propyl-1,3-propanediol, 2,2,4-trimethyl-1,3-pentanediol, neopentylglycol hydroxypivalate, and mixtures thereof.

8. The method of claim 1, wherein the aqueous component comprises from 0.1 to 80% by weight of water of reaction, based on the total weight of the aqueous component.

9. The method of claim 1, wherein the at least one binder is selected from the group consisting of polyester, alkyd, acrylate, epoxy, polyurethane, amino, epoxide modified polyester resins, and mixtures thereof.

10. A method of preparing a solution or dispersion of an aqueous coating composition comprising preparing a binder by a condensation reaction of alcohols and carboxylic acids, wherein water from the reaction remains in the aqueous coating composition.

11. The method of claim 10, wherein the alcohols are polyols and the carboxylic acids are polycarboxylic acids.

12. The method of claim 10 further comprising adding deionized or distilled water to the aqueous coating composition.

13. The method of claim 10 further comprising adding additional binders.

14. The method of claim 13, wherein the binders are selected from the group consisting of polyester, alkyd, acrylate, epoxy, polyurethane, amino, epoxide modified polyester resins, and mixtures thereof.

15. The method of claim 10, wherein the water from the reaction comprises water and contaminants consisting of those selected from the group consisting of polyols, monoalcohols, partial aldehydes of polyols, acetals, cyclic oxygen-containing compounds, unreacted reactants, water-soluble degradation products, and mixtures thereof.

16. The method of claim 10, wherein the carboxylic acids are selected from the group consisting of trimellitic acids, trimesic acids (1,3,5-benzenetricarboxylic acid), pyromellitic acids, trimeric fatty acids, dimethylolpropionic acid, phthalic acids, isophthalic acids, terephthalic acids, fumaric acids, maleic acids, and mixtures thereof.

17. The method of claim 10, wherein alcohols are polyalcohols selected from the group consisting of ethylene glycol, propanediols, butanediols, pentanediols, hexanediols, diethylene glycol, glycerol, trimethylolethane, trimethylolpropane, pentaerythritol, dispentaerythritol, 2-methyl-2-propyl-1,3-propanediol, 2,2,4-trimethyl-1,3-pentanediol, neopentylglycol hydroxypivalate, and mixtures thereof.

* * * * *

UNITED STATES PATENT AND TRADEMARK OFFICE
CERTIFICATE OF CORRECTION

PATENT NO. : 6,355,722 B2 Page 1 of 1
DATED : March 12, 2002
INVENTOR(S) : Ulrich Poth et al.

It is certified that error appears in the above-identified patent and that said Letters Patent is hereby corrected as shown below:

Column 8,
Line 9, after "carboxylic", and before "is", please delete "acids", and insert -- acid --;

Signed and Sealed this

Fifteenth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,355,722 B2
DATED : March 12, 2002
INVENTOR(S) : Ulrich Poth et al.

It is certified that error appears in the above-identified patent and that said Letters Patent is hereby corrected as shown below:

<u>Column 8,</u>
Line 9, after "carboxylic", and before "is", please delete "acids", and insert -- acid --;

Signed and Sealed this

Fourth Day of February, 2003

JAMES E. ROGAN
*Director of the United States Patent and Trademark Office*